US007649869B2

(12) United States Patent
Mittal et al.

(10) Patent No.: US 7,649,869 B2
(45) Date of Patent: Jan. 19, 2010

(54) EFFICIENT CELL MEASUREMENTS DURING TRANSMISSION GAPS IN A COMPRESSED MODE

(75) Inventors: Mukesh K. Mittal, San Diego, CA (US); Mohit Narang, Escondido, CA (US); Srinivasan Vasudevan, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 715 days.

(21) Appl. No.: 11/367,499

(22) Filed: Mar. 2, 2006

(65) Prior Publication Data

US 2007/0037601 A1 Feb. 15, 2007

Related U.S. Application Data

(60) Provisional application No. 60/707,815, filed on Aug. 12, 2005.

(51) Int. Cl.
*H04W 4/00* (2009.01)
(52) U.S. Cl. ............... 370/332; 455/513; 455/515; 455/115.3; 370/252
(58) Field of Classification Search .......... 455/436, 455/525, 513, 434; 370/252, 332
See application file for complete search history.

(56) References Cited

U.S. PATENT DOCUMENTS

| 2003/0031143 A1 | 2/2003 | Faerber |
| 2004/0156324 A1* | 8/2004 | Steudle .................. 370/278 |
| 2007/0037594 A1* | 2/2007 | Palenius et al. ............ 455/502 |
| 2007/0218835 A1* | 9/2007 | Hindelang et al. ............ 455/8 |
| 2008/0189970 A1* | 8/2008 | Wang et al. .................. 33/701 |
| 2009/0042559 A1* | 2/2009 | Choi ........................ 455/423 |

FOREIGN PATENT DOCUMENTS

WO  WO02067458 A1  8/2002

OTHER PUBLICATIONS

Lugara et al.; "UMTS to GSM handover based on compressed mode technique"; 2004 IEEE International Conference on Paris, France; Jun. 20, 2004; pp. 1 -22; XP010709763; IEEE; Piscataway, NJ, USA.

\* cited by examiner

*Primary Examiner*—Patrick N. Edouard
*Assistant Examiner*—Wayne Cai
(74) *Attorney, Agent, or Firm*—Howard H. Seo; Kristine U. Ekwueme

(57) ABSTRACT

A terminal obtains a monitored set containing GSM neighbor cells and/or UMTS neighbor cells. The terminal operates in a compressed mode and obtains from a UMTS network at least two transmission gap pattern sequences for different measurement purposes, e.g., for "GSM carrier RSSI measurements" (GAP1), "GSM initial BSIC identification" (GAP2), and "GSM BSIC re-confirmation" (GAP3). The terminal makes RSSI measurements for the GSM cells using multiple transmission gap pattern sequences, e.g., using GAP1, GAP2 and GAP3. The terminal identifies the BSIC for at least one GSM cell by (1) detecting the tone on the FCCH using multiple transmission gap pattern sequences, e.g., using GAP2 and GAP3, and (2) decoding the SCH using multiple transmission gap pattern sequences, e.g., using GAP2 and GAP3. The use of multiple transmission gap pattern sequences for RSSI measurement and BSIC identification allows the terminal to complete the cell measurements and send a report sooner, which may improve performance.

25 Claims, 10 Drawing Sheets

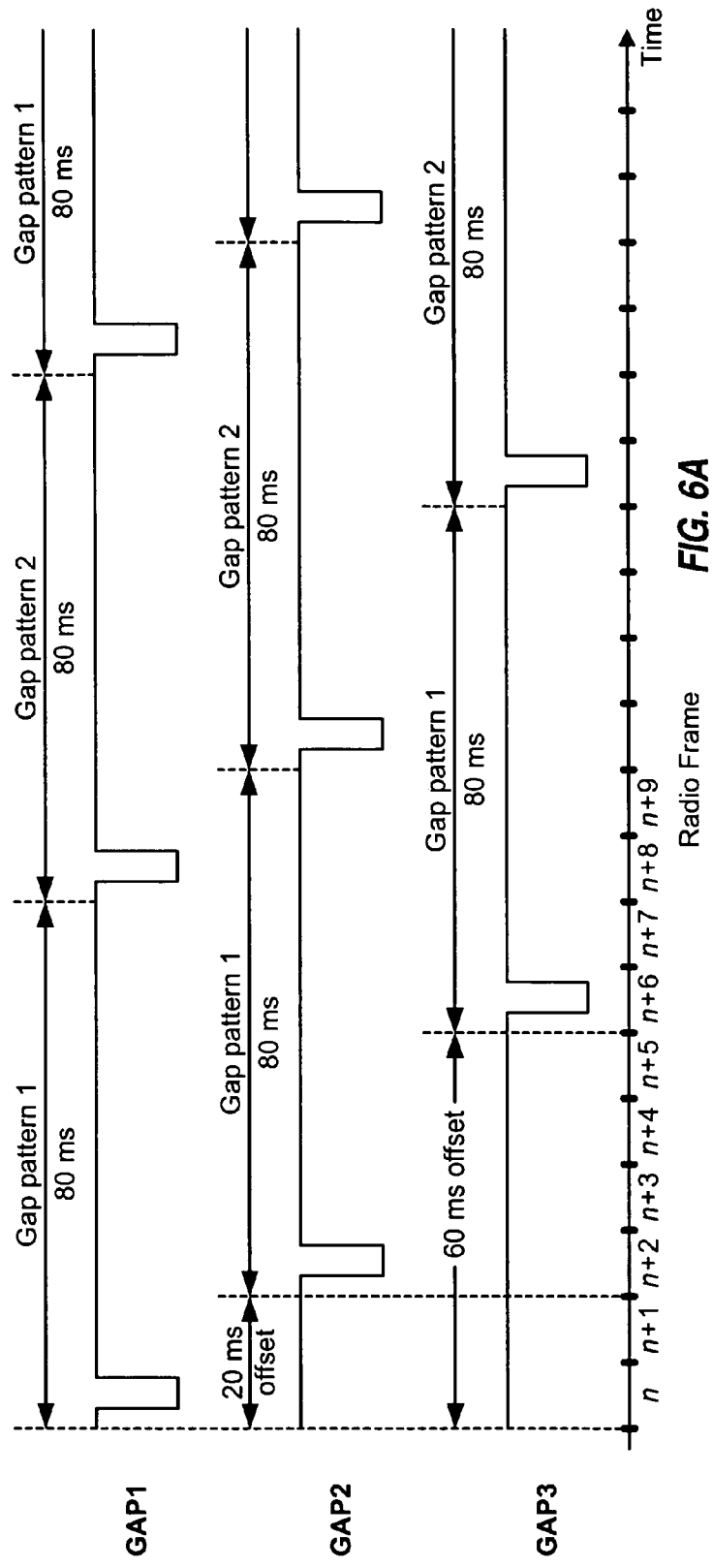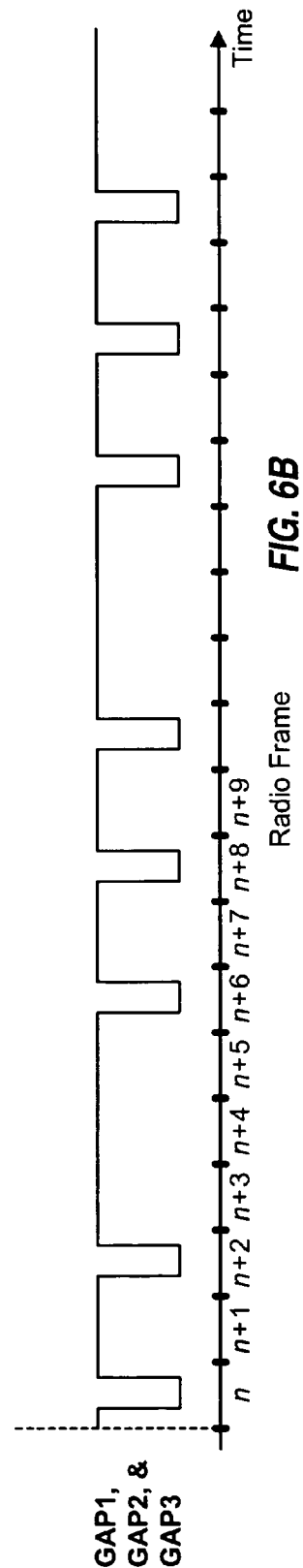
FIG. 6A
FIG. 6B

EFFICIENT CELL MEASUREMENTS DURING TRANSMISSION GAPS IN A COMPRESSED MODE

The present Application for Patent claims priority to Provisional Application No. 60/707,815 entitled "IMPROVEMENTS IN UMTS COMPRESSED MODE" filed Aug. 12, 2005, and assigned to the assignee hereof and hereby expressly incorporated by reference herein.

BACKGROUND

I. Field

The present disclosure relates generally to communication, and more specifically to cell measurements in asynchronous communication networks.

II. Background

Wireless communication networks are widely deployed to provide various communication services such as voice, packet data, broadcast, messaging, and so on. These wireless networks may be capable of supporting communication for multiple users by sharing the available network resources. Examples of such wireless networks include Code Division Multiple Access (CDMA) networks, Time Division Multiple Access (TDMA) networks, and Frequency Division Multiple Access (FDMA) networks. These wireless networks may also utilize various radio access technologies (RATs) such as Wideband-CDMA (W-CDMA), cdma2000, Global System for Mobile Communications (GSM), and so on, which are known in the art.

A terminal may be capable of communicating with multiple wireless networks such as a Universal Mobile Telecommunication System (UMTS) network that implements W-CDMA and a GSM network. Each wireless network typically includes many cells, where the term "cell" can refer to a base station or the coverage area of the base station, depending on the context in which the term is used. The terminal typically communicates with a serving cell in only one wireless network at any given moment but may periodically make measurements for cells in the other wireless network. The cell measurements may include measurements for received signal strength, frequency, timing, and identity of the cells. The cell measurements allow the terminal to ascertain whether any cell in the other wireless network is better than the current serving cell. If a better cell in the other wireless network is found, then the terminal may switch to the other wireless network and receive service from the better cell.

It is desirable to complete the cell measurements as quickly as possible. For example, the terminal may be mobile and may have moved outside the coverage of the serving wireless network. By completing the cell measurements and reporting the better cells sooner, the terminal may be handed off to a better cell before the call is dropped. However, the GSM and UMTS networks may operate asynchronously so that the timing of the cells in the GSM network cannot be ascertained based on the timing of the cells in the UMTS network, and vice versa. Furthermore, the cells in each network may operate asynchronously of one another. The asynchronous operation at the network and cell levels complicates cell measurement.

There is therefore a need in the art for techniques to efficiently make cell measurements in asynchronous communication networks.

SUMMARY

Techniques for efficiently making cell measurements in asynchronous communication networks, e.g., GSM and UMTS networks, are described herein. A terminal obtains a monitored set containing GSM neighbor cells and/or UMTS neighbor cells. The terminal operates in a compressed mode and obtains from the UMTS network at least two transmission gap pattern sequences for different measurement purposes. For example, the terminal may obtain a transmission gap pattern sequence for "GSM carrier RSSI measurements" (GAP1), a transmission gap pattern sequence for "GSM initial BSIC identification" (GAP2), and a transmission gap pattern sequence for "GSM BSIC re-confirmation" (GAP3). Each transmission gap pattern sequence indicates gaps in transmission, or transmission gaps, that allow the terminal to make measurements for neighbor cells in the compressed mode.

In an embodiment, the terminal makes received signal strength indicator (RSSI) measurements for the GSM cells in the monitored set using multiple ones of the allocated transmission gap pattern sequences, e.g., using GAP1, GAP2 and GAP3. The terminal then identifies the base transceiver station identity code (BSIC) for at least one GSM cell, e.g., the 8 strongest GSM cells. For the BSIC identification, the terminal may initially detect for a tone on a frequency correction channel (FCCH) from each GSM cell using multiple transmission gap pattern sequences, e.g., using GAP2 and GAP3. The terminal may then decode a synchronization channel (SCH) from each GSM cell using multiple transmission gap pattern sequences, e.g., using GAP2 and GAP3. The terminal reports the identified GSM cell(s). The use of multiple transmission gap pattern sequences for RSSI measurement and BSIC identification allows the terminal to complete the cell measurements and send the report sooner, which may improve performance. After the initial reporting, the terminal may perform RSSI measurement, BSIC identification, and BSIC re-confirmation in the normal manner using the transmission gap pattern sequences allocated for these purposes.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIG. 6A shows an exemplary set of GAP1, GAP2 and GAP3.
FIG. 6B shows transmission gaps available with GAP1, GAP2 and GAP3.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The cell measurement techniques described herein may be used for various asynchronous communication networks. For clarity, these techniques are specifically described below for GSM and UMTS networks.

Figure 1:
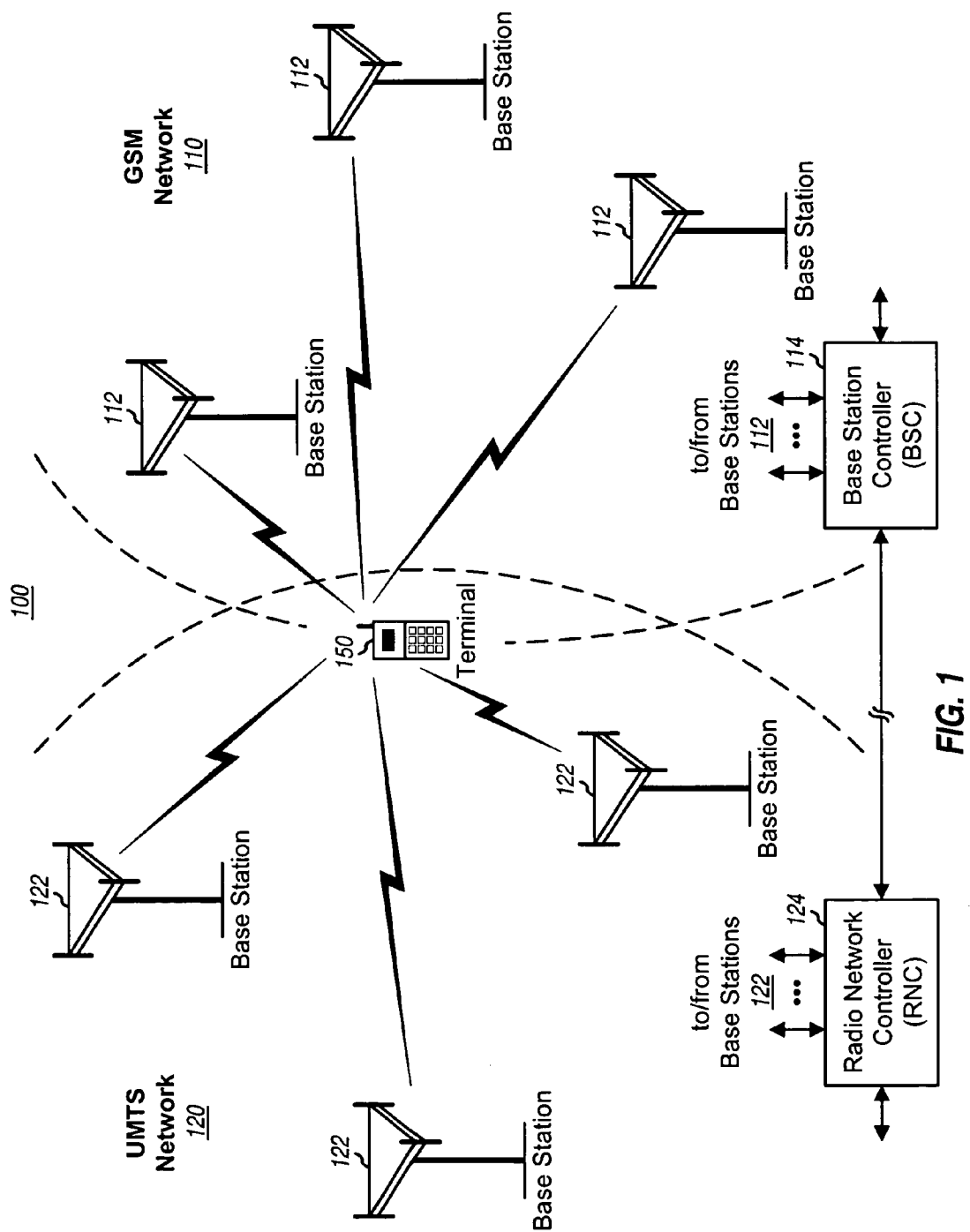
FIG. 1 shows a GSM network and a UMTS network.

FIG. 1 shows a public land mobile network (PLMN) 100 that includes a GSM network 110 and a UMTS network 120. The terms "network" and "system" are often used interchangeably. GSM is a radio access technology (RAT) that can provide voice service and low to medium rate packet data service. GSM networks are widely deployed throughout the world. W-CDMA is a new radio access technology that can provide enhanced services and capabilities, e.g., higher data rates, concurrent voice and data calls, and so on. UMTS network 120 implements W-CDMA and is also called a UMTS Terrestrial Radio Access Network (UTRAN). The terms "UMTS" and "W-CDMA" are used interchangeably in the following description. GSM network 110 and UMTS network 120 are two wireless networks employing different radio access technologies (GSM and W-CDMA) but belonging to the same service provider or network operator. GSM and UMTS are described in documents from a consortium named "3rd Generation Partnership Project" (3GPP), which are publicly available.

GSM network 110 includes base stations 112 that communicate with terminals within the coverage area of the GSM network. A base station is a fixed station that communicates with the terminals and may also be called a Node B, a base transceiver station (BTS), an access point, and so on. A base station controller (BSC) 114 couples to base stations 112 and provides coordination and control for these base stations. UMTS network 120 includes base stations 122 that communicate with terminals within the coverage area of the UMTS network. A radio network controller (RNC) 124 couples to base stations 122 and provides coordination and control for these base stations. RNC 124 communicates with BSC 114 to support inter-working between the GSM and UMTS networks.

A multi-mode terminal 150 (e.g., a dual-mode cellular phone) can communicate with GSM network 110 and UMTS network 120, typically with one wireless network at any given moment. This capability allows a user to obtain the performance advantages of UMTS and the coverage benefits of GSM with the same terminal. Terminal 150 may be fixed or mobile and may also be called a user equipment (UE), a mobile station (MS), a mobile equipment (ME), and so on. Terminal 150 may be a cellular phone, a personal digital assistant (PDA), a wireless modem, a wireless communication device, a subscriber unit, and so on.

Figure 2:
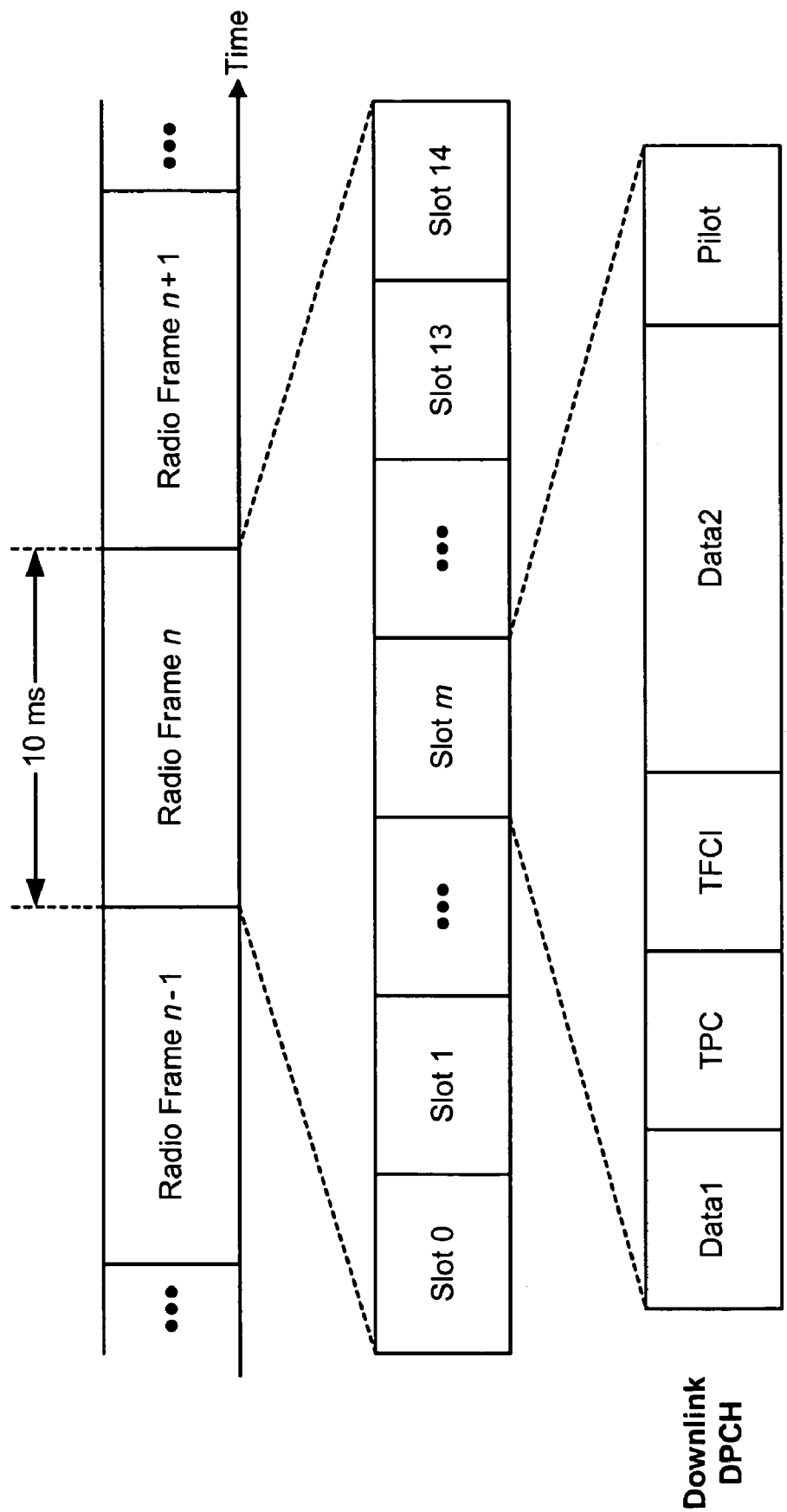
FIG. 2 shows a frame structure for the downlink in UMTS.

FIG. 2 shows a frame structure for the downlink in UMTS. This frame structure is used for a downlink dedicated physical channel (DPCH), which carries user-specific data for a terminal. The timeline for data transmission is divided into radio frames. Each radio frame is identified by a 12-bit system frame number (SFN) that is sent on a control channel. The SFN is reset to zero at a specific time, is incremented by one for each radio frame thereafter, and wraps around to zero after reaching the maximum value of 4095. Each radio frame has a duration of 10 milliseconds (ms) and is further partitioned into 15 slots, which are labeled as slot 0 through slot 14. Each slot includes two data fields (Data1 and Data2) for user-specific data, a transmit power control (TPC) field for power control information, a transport format combination indicator (TFCI) field for format information (e.g., the number of transport blocks, the transport block sizes, and so on), and a pilot field for a pilot.

Figure 3:
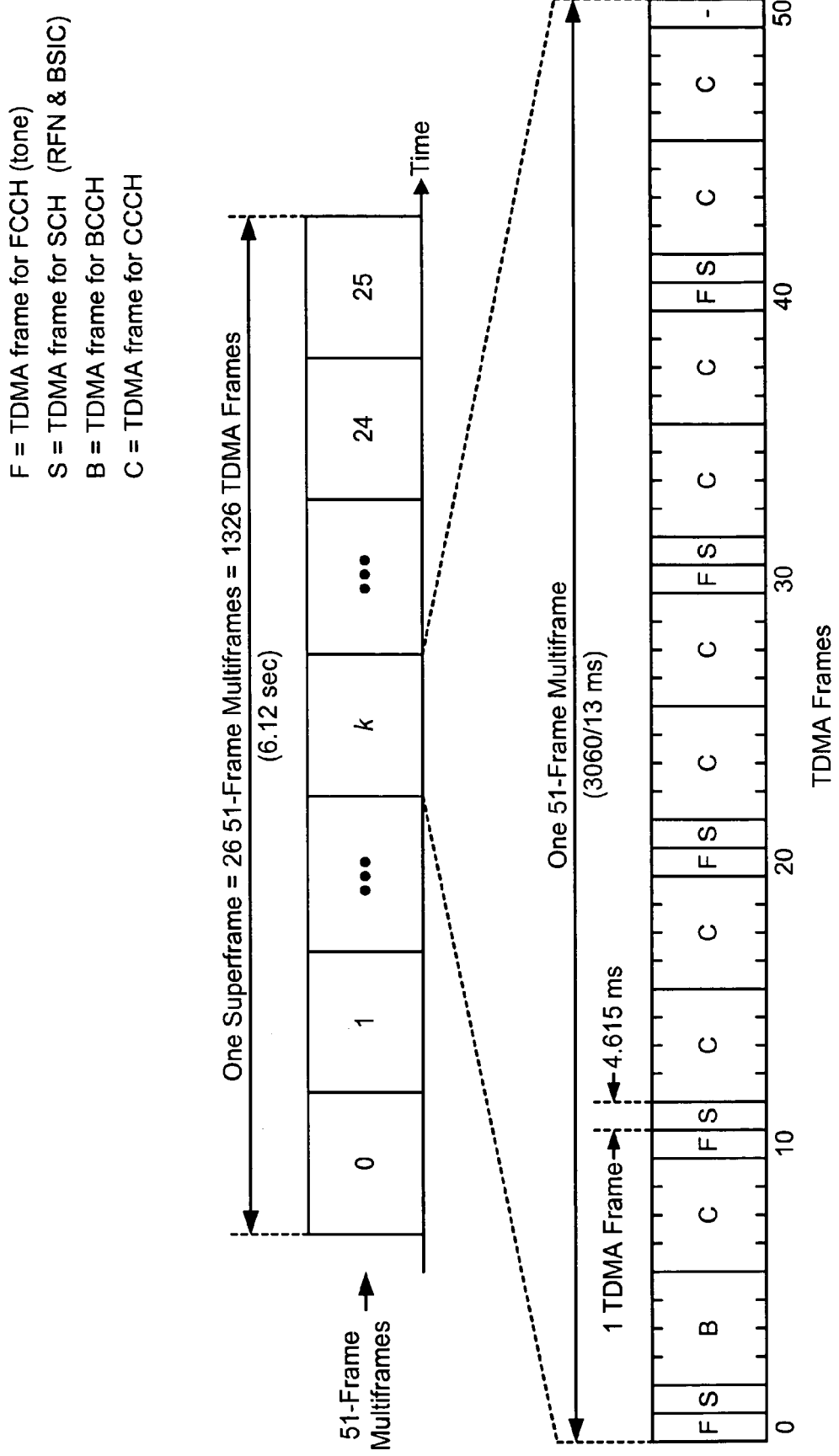
FIG. 3 shows a frame structure in GSM.

FIG. 3 shows a frame structure in GSM. The timeline for data transmission is divided into superframes. Each superframe has a duration of 6.12 seconds and includes 1326 TDMA frames. A superframe may be partitioned into either 26 51-frame multiframes (as shown in FIG. 3) or 51 26-frame multiframes. The control/overhead channels in GSM use the 51-frame multiframe structure. Each 51-frame multiframe includes 51 TDMA frames, which are labeled as TDMA frames 0 through 50. Each TDMA frame has a duration of 4.615 ms. In the following description, the TDMA frames are also referred to as GSM frames.

The control channels for GSM include a frequency correction channel (FCCH), a synchronization channel (SCH), a broadcast control channel (BCCH), and a common control channel (CCCH). The FCCH carries a tone that allows the terminals to obtain frequency and coarse timing information for the GSM cell transmitting the FCCH. The FCCH is sent in GSM frames 0, 10, 20, 30 and 40 of each 51-frame multiframe. The SCH carries (1) a reduced GSM frame number (RFN) that is used by the terminals to synchronize their timing and frame numbering and (2) a BSIC that identifies the GSM cell transmitting the SCH. The SCH is sent in GSM frames 1, 11, 21, 31 and 41 of each 51-frame multiframe. The BCCH carries system information and is sent in GSM frames 2, 3, 4 and 5 of each 51-frame multiframe. The CCCH carries control information and is also used to implement a paging channel (PCH), which carries paging messages for idle terminals. The control channels in GSM are described in a document 3GPP TS 05.01, which is publicly available.

GSM network 110 operates on one or more frequency bands. Each frequency band covers a range of frequencies and is divided into a number of 200 kHz radio frequency (RF) channels. Each RF channel is identified by a specific ARFCN (absolute radio frequency channel number). For example, the GSM 900 frequency band includes ARFCNs 1 through 124, the GSM 1800 frequency band includes ARFCNs 512 through 885, and the GSM 1900 frequency band includes ARFCNs 512 through 810.

Each GSM cell transmits traffic data and overhead data on a set of RF channels assigned to that cell by a network operator. To reduce inter-cell interference, GSM cells located near each other are assigned different sets of RF channels, so that the transmissions from these cells do not interfere one another. Each GSM cell transmits the FCCH, SCH, and BCCH on one or more of the RF channels assigned to that cell. An RF channel used to transmit these control channels is called a BCCH carrier.

Terminal 150 may communicate with UMTS network 120, e.g., for a voice call. Terminal 150 may receive from UMTS network 120 a monitored set containing up to 32 GSM neighbor cells and up to 64 UMTS neighbor cells. The monitored set may also be called a neighbor cell list or by some other name. The monitored set indicates (1) the ARFCN of the BCCH carrier and the BSIC of each GSM neighbor cell and (2) the universal ARFCN (UARFCN) and the scrambling code of each UMTS neighbor cell. Terminal 150 makes measurements for the GSM and UMTS cells in the monitored set, as specified by 3GPP, to look for better cells.

In GSM network 110, neighboring cells transmit on different RF channels in order to avoid intra-cell interference, as noted above. Thus, in order to make measurements for GSM neighbor cells, terminal 150 may need to tune its RF receiver away from a UMTS serving cell. While tuned away, terminal 150 is not able to receive data from or transmit data to the UMTS serving cell. UMTS provides a mechanism to allow terminal 150 to make measurements for GSM cells without losing data from the UMTS network.

UMTS supports a compressed mode on the downlink. In the compressed mode, the UMTS serving cell transmits data to terminal 150 during only a portion of a radio frame, which then creates a transmission gap in the remaining portion of the frame. Terminal 150 can temporarily leave UMTS network 120 during the transmission gap to make measurements for GSM cells.

Figure 4:
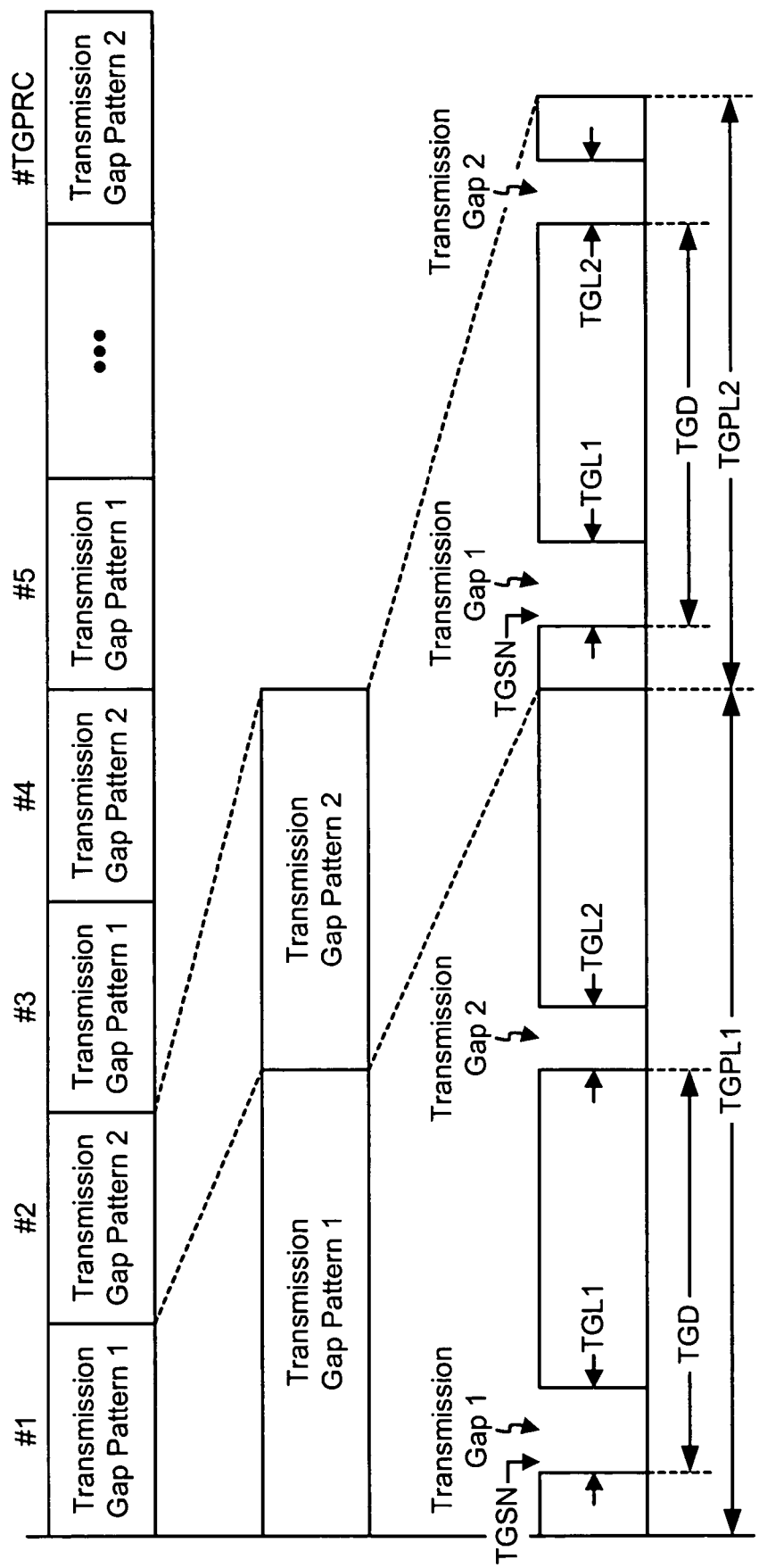
FIG. 4 shows a compressed mode transmission in UMTS.

FIG. 4 shows a compressed mode transmission in UMTS. In the compressed mode, user-specific data for terminal 150 is transmitted in accordance with a transmission gap pattern sequence, which consists of alternating transmission gap patterns 1 and 2. Each transmission gap pattern includes one or two transmission gaps. Each transmission gap may occur entirely within one radio frame or may span across two radio frames. The transmission gap pattern sequence is defined by the following parameters:

TGPRC (transmission gap pattern repetition count)—the number of transmission gap patterns within the transmission gap pattern sequence.

TGSN (transmission gap starting slot number)—the slot number of the first transmission gap slot in the transmission gap pattern (slot 1 to 14).

TGL1 (transmission gap length 1)—the duration of the first transmission gap in each transmission gap pattern (1 to 14 slots).

TGL2 (transmission gap length 2)—the duration of the second transmission gap in each transmission gap pattern (1 to 14 slots).

TGD (transmission gap distance)—the duration between the starting slots of the first and second transmission gaps (15 to 269 slots).

TGPL1 (transmission gap pattern length 1)—the duration of transmission gap pattern 1 (1 to 144 frames).

TGPL2 (transmission gap pattern length 2)—the duration of transmission gap pattern 2 (1 to 144 frames).

The compressed mode is described in documents 3GPP TS 25.212 (section 4.4), 25.213 (sections 5.2.1 and 5.2.2), and 25.215 (section 6.1), all of which are publicly available.

Figure 5:
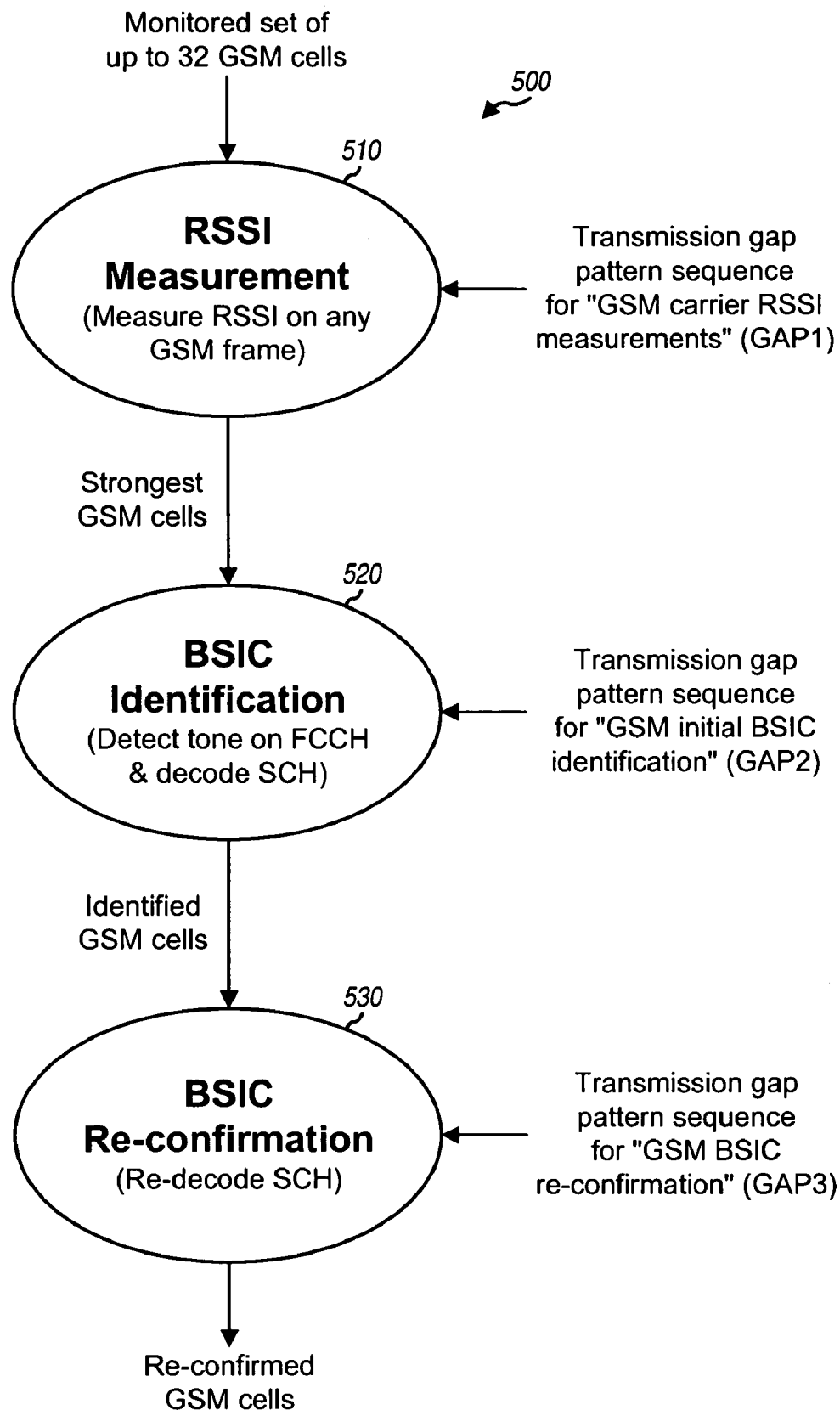
FIG. 5 shows a process for measuring GSM cells.

FIG. 5 shows an exemplary process 500 for measuring GSM cells in accordance with 3GPP TS 25.133. Terminal 150 may perform process 500, for example, during a voice call with UMTS network 120. Terminal 150 obtains from UMTS network 120 a monitored set with up to 32 GSM neighbor cells and up to 64 UMTS cells. UMTS network 120 may request terminal 150 to measure the GSM cells with BSIC verified. In this case, terminal 150 measures the received signal strength for the GSM cells in the monitored set and obtains a set of RSSI measurements for these GSM cells (block 510). The RSSI measurements may be made using a transmission gap pattern sequence with the purpose of "GSM carrier RSSI measurements", which is called GAP1. The RSSI measurement in block 510 is described in detail below.

Terminal 150 sorts the GSM cells in the monitored set in descending order based on the RSSI measurements for these GSM cells. Hence, terminal 150 does not proceed to block 520 until the initial/first set of RSSI measurements has been obtained for all GSM cells in the monitored set. Terminal 150 then identifies the BSIC of up to eight strongest GSM cells, which are candidates for handover (block 520). The BSIC identification may be performed using a transmission gap pattern sequence with the purpose of "GSM initial BSIC identification", which is called GAP2. The BSIC identification in block 520 is also described in detail below. Terminal 150 periodically re-confirms the BSIC of each identified GSM cell (block 530). The BSIC re-confirmation may be performed using a transmission gap pattern sequence with the purpose of "GSM BSIC re-confirmation", which is called GAP3.

Terminal 150 reports GSM cells to UMTS network 120 whenever reporting is triggered. For example, measurement reporting may be triggered by an event (for event triggered reporting), by expiration of a timer (for periodic reporting), and so on. Terminal 150 may continually perform RSSI measurement, BSIC identification, and BSIC reconfirmation in order to maintain an up-to-date list of candidate GSM cells for handover.

UMTS network 120 provides GAP1, GAP2 and GAP3 for the purposes of RSSI measurement, BSIC identification, and BSIC re-confirmation, respectively, if terminal 150 requires compressed mode. UMTS network 120 typically provides all three GAPs at the same time, e.g., at the start of a voice call. UMTS network 120 may define GAP 1, GAP2 and GAP3 in various manners.

FIG. 6A shows an exemplary set of GAP1, GAP2 and GAP3 that may be provided to terminal 150. Table 1 lists the parameters for this exemplary set of GAP1, GAP2 and GAP3. In Table 1, transmission gap measurement purpose (TGMP) of 2, 3 and 4 correspond to GAP1, GAP2 and GAP3, respectively. Each GAP has an infinite duration, which is denoted by a value of 0 for TGPRC (not shown in Table 1). GAP1 starts at connection frame number (TGCFN) n, GAP2 starts at connection frame number n+2, and GAP3 starts at connection frame number n+6. In general, the TGCFN for each GAP is chosen in such that (1) transmission gaps from two different GAPs do not collide in a single radio frame and (2) no more than two radio frames out of any three consecutive radio frames are compressed.

Each GAP includes two transmission gap patterns. Each transmission gap pattern has a duration of 8 frames or 80 ms and includes one transmission gap that is 7 slots or 4.67 ms wide. The second transmission gap in each transmission gap pattern is omitted by setting TGD to 270 slots. The transmission gaps for each GAP are thus spaced apart by 80 ms. The transmission gaps in GAP2 are delayed by 2 frames or 20 ms with respect to the transmission gaps in GAP1. The transmission gaps in GAP3 are delayed by 4 frames or 40 ms with respect to the transmission gaps in GAP2.

TABLE 1

| GAP | TGMP | TGPRC | TGCFN | TGSN (slot index) | TGL1 (slots) | TGL2 (slots) | TGD (slots) | TGPL1 (frames) | TGPL2 (frames) |
| --- | --- | --- | --- | --- | --- | --- | --- | --- | --- |
| GAP1 | 2 | infinite | n | 4 | 7 | — | 270 | 8 | 8 |
| GAP2 | 3 | infinite | n + 2 | 4 | 7 | — | 270 | 8 | 8 |
| GAP3 | 4 | infinite | n + 6 | 4 | 7 | — | 270 | 8 | 8 |

FIG. 6A and Table 1 show an exemplary set of GAP1, GAP2 and GAP3 that may be allocated for cell measurement. UMTS network 120 may also allocate GAPs having different parameter values than those given in Table 1.

Conventionally, terminal 150 performs the three tasks in blocks 510, 520 and 530 in FIG. 5 in a sequential order when terminal 150 first receives the monitored set and the transmission gap pattern sequences from UMTS network 120. Each of the three tasks may be performed as described below.

Terminal 150 first performs RSSI measurement in block 510 for all GSM cells in the monitored set and obtains a set of RSSI measurements for these GSM cells. Terminal 150 is required to take at least 3 RSSI samples for each GSM cell and to filter/average these RSSI samples to obtain an RSSI measurement for that GSM cell. Each RSSI sample is a power measurement for one RF channel of one GSM cell. The power measurement may be made in any GSM frame. Terminal 150 spaces the RSSI samples for each GSM cell as far apart in time as possible. This may be achieved, for example, by cycling through the GSM cells in the monitored set three times and taking one RSSI sample for each GSM cell in each cycle through the monitored set. Terminal 150 is required to take some minimum number of RSSI samples in each transmission gap, with this minimum number being dependent on the width of the transmission gap. For example, terminal 150 is required to take a minimum of 6 RSSI samples in each transmission gap of 7 slots.

The total time required to obtain the initial set of RSSI measurements is dependent on (1) the number of GSM cells in the monitored set, (2) the number of transmission gaps used for RSSI measurement, and (3) the duration of each transmission gap used for RSSI measurement. The number of GSM cells and the transmission gap duration are typically determined by UMTS network 120. The number of transmission gaps required to complete the RSSI measurement is dependent on the number of transmission gap pattern sequences used for the RSSI measurement.

Conventionally, terminal 150 uses only the transmission gaps in GAP1 for RSSI measurement. If terminal 150 is given a monitored set with 32 GSM cells, then terminal 150 would need to take at least 96 RSSI samples for the 32 GSM cells. If terminal 150 can take 6 RSSI samples per transmission gap of 7 slots, as required by 3GPP TS 25.133, then terminal 150 can obtain 96 RSSI samples in 96/6=16 transmission gaps. If terminal 150 uses only the transmission gaps in GAP1 for RSSI measurement, as is conventionally done, and if these transmission gaps are spaced apart by 80 ms for the example shown in FIG. 6A, then terminal 150 can obtain 96 RSSI samples in approximately 16×80=1280 ms.

In an aspect, terminal 150 obtains an initial set of RSSI measurements for GSM cells using multiple (e.g., all) transmission gap pattern sequences allocated by UMTS network 120 for different purposes. Terminal 150 is not able to use GAP2 and GAP3 for the intended purposes of BSIC identification and BSIC re-confirmation, respectively, until after the initial set of RSSI measurements has been obtained. Hence, terminal 150 can efficiently utilize GAP2 and GAP3 as well as GAP1 to complete the initial set of RSSI measurements in a shorter time period.

FIG. 6B shows the transmission gaps available for making RSSI measurements using all three transmission gap pattern sequences GAP1, GAP2 and GAP3. As shown in FIG. 6B, GAP1, GAP2 and GAP3 provide terminal 150 with three times the number of transmission gaps for making RSSI measurements. Hence, terminal 150 may be able to complete the initial set of RSSI measurements in approximately one third of the time required by the conventional method with only GAP1. If the transmission gaps in each GAP are spaced apart by 80 ms for the example shown in FIG. 6A, then terminal 150 can obtain 96 RSSI samples in approximately 16×80/3=427 ms. Terminal 150 can shorten the RSSI measurement time from 1280 ms to 427 ms for the example described above.

As shown by the example above, terminal 150 can substantially shorten the amount of time to obtain the initial set of RSSI measurements for the GSM cells. The shorter RSSI measurement period allows terminal 150 to shorten the amount of time needed to report the GSM cells, which is highly desirable.

After completing the RSSI measurements, terminal 150 ranks the RSSI measurements for all GSM cells in the monitored set and selects the eight strongest GSM cells. Terminal 150 then identifies the BSIC of each GSM cell. Terminal 150 typically performs BSIC identification for the eight strongest GSM cells in a sequential order, starting with the strongest GSM cell, then the next strongest GSM cell, and so on. For BSIC identification, terminal 150 gives priority to GSM cells whose BSIC is unknown, as described in 3GPP TS 25.133.

Terminal 150 may perform BSIC identification for a given GSM cell x in two steps. In step 1, terminal 150 detects for a tone sent by GSM cell x on the FCCH. In step 2, terminal 150 decodes the SCH burst sent by GSM cell x to obtain the BSIC for that GSM cell. Terminal 150 typically does not have any timing information for GSM cell x. Hence, terminal 150 typically performs tone detection for GSM cell x in each available transmission gap until a tone is detected for GSM cell x. The tone detection provides terminal 150 with frequency and coarse timing information for GSM cell x. The coarse timing information allows terminal 150 to ascertain (to within one GSM frame) when the SCH for GSM cell x is transmitted. Terminal 150 may then decode the SCH for GSM cell x in the next transmission gap that aligns with the SCH.

For step 1, the first transmission gap used for tone detection may start anywhere within the 51-frame multiframe shown in FIG. 3. If the first transmission gap happens to overlap the FCCH for GSM cell x, then terminal 150 can detect the tone for GSM cell x in one transmission gap. However, if the first transmission gap is not aligned with the FCCH for GSM cell x, then terminal 150 may require one or more additional transmission gaps in order to detect the tone on the FCCH.

Figure 7A:
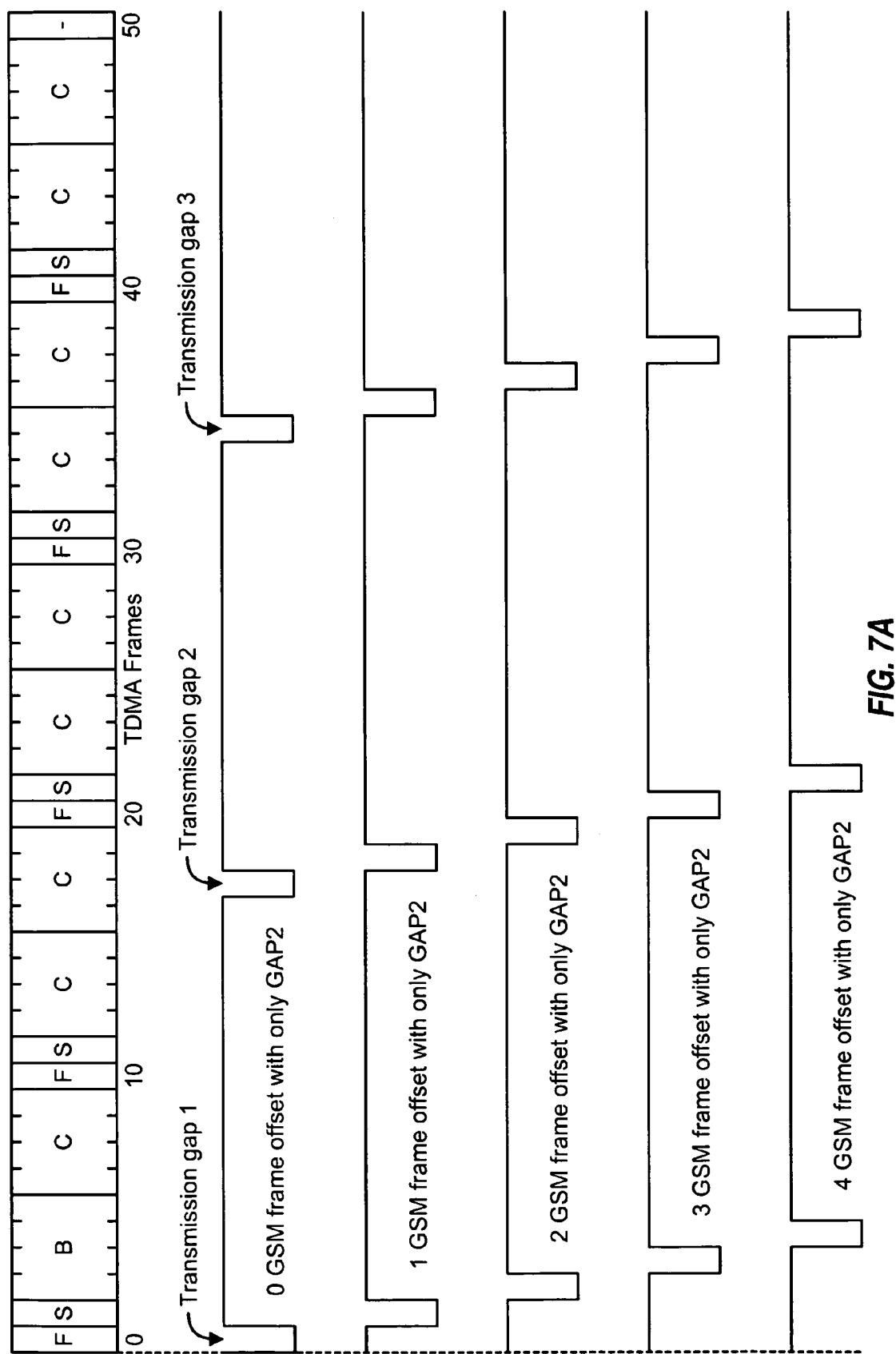
FIG. 7A shows alignment of transmission gaps in GAP2 to GSM frames.

FIG. 7A shows the alignment of the transmission gaps in GAP2 to the GSM frames in a 51-frame multiframe for different frame offsets. A frame offset of i GSM frames, where $i \in \{1, \ldots, 9\}$, means that the first transmission gap used for tone detection misses the first FCCH in the 51-frame multiframe (i.e., the FCCH in GSM frame 0) by i GSM frames. FIG. 7A and Table 2 below are for the example shown in FIG. 6A in which (1) the transmission gaps in GAP2 are spaced apart by 80 ms or 17.33 GSM frames and (2) each transmission gap has a width of 7 slots or 4.67 ms, which is slightly wider than one GSM frame of 4.615 ms. As shown in FIG. 7A, the transmission gaps for GAP2 overlap different GSM frames for different frame offsets.

Table 2 gives the number of transmission gaps needed for tone detection for GSM cell x using only the transmission gaps in GAP2. In Table 2, column 1 gives different frame offsets for the first transmission gap used for tone detection. Columns 2 through 11 are for the first 10 transmission gaps in GAP2 used for tone detection. One row is provided in Table 2 for each different frame offset. Each row gives the GSM frame number corresponding to the start of each of the first 10 transmission gaps in GAP2, given the frame offset associated with that row. For example, the row for 1 frame offset indicates that the start of the first transmission gap is at GSM frame 1.00, the start of the second transmission gap is at GSM frame 18.33 (or ⅓ of the way into GSM frame 18), the start of the third transmission gap is at GSM frame 35.67 (or ⅔ of the way into GSM frame 35), the start of the fourth transmission gap is at GSM frame 2.00 in the next multiframe, and so on.

Figure 7B:
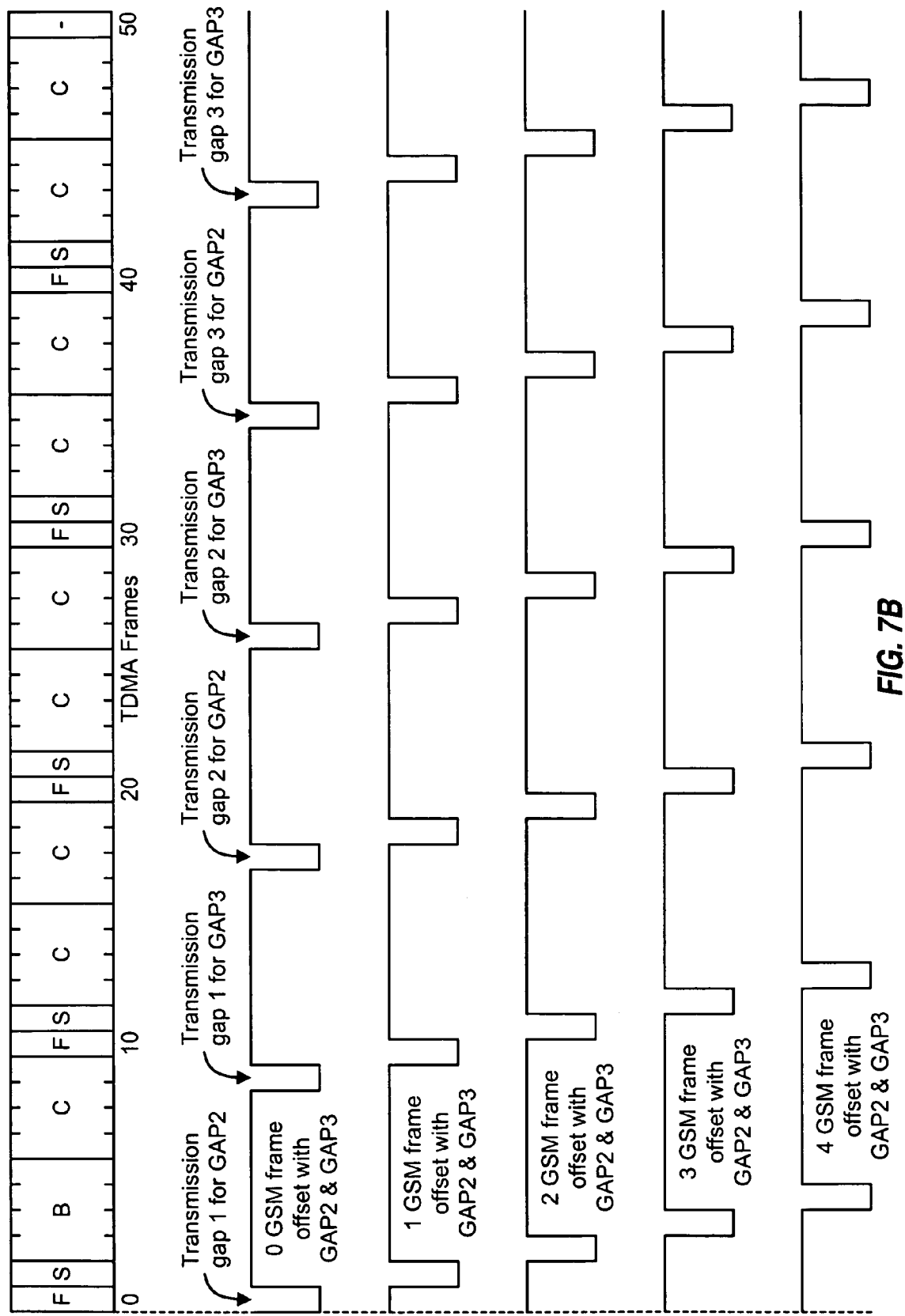
FIG. 7B shows alignment of transmission gaps in GAP2 and GAP3 to GSM frames.

FIG. 7B shows the alignment of the transmission gaps in GAP2 and GAP3 to the GSM frames in a 51-frame multiframe for different frame offsets. FIG. 7B and Table 3 below are for the example shown in FIG. 6A in which (1) the transmission gaps in GAP2 are spaced apart by 80 ms, (2) the

TABLE 2

Tone detection with only GAP2

| | Transmission gaps in GAP2 | | | | | | | | | | |
|---|---|---|---|---|---|---|---|---|---|---|---|
| Frame offset | 1 | 2 | 3 | 4 | 5 | 6 | 7 | 8 | 9 | 10 | 11 |
| 1 | 1.00 | 18.33 | 35.67 | 2.00 | 19.34 | 36.67 | 3.01 | 20.34 | 37.68 | 4.01 | 21.35 |
| 2 | 2.00 | 19.33 | 36.67 | 3.00 | 20.34 | 37.67 | 4.01 | 21.34 | 38.68 | 5.01 | 22.35 |
| 3 | 3.00 | 20.33 | 37.67 | 4.00 | 21.34 | 38.67 | 5.01 | 22.34 | 39.68 | 6.01 | 23.35 |
| 4 | 4.00 | 21.33 | 38.67 | 5.00 | 22.34 | 39.67 | 6.01 | 23.34 | 40.68 | 7.01 | 24.35 |
| 5 | 5.00 | 22.33 | 39.67 | 6.00 | 23.34 | 40.67 | 7.01 | 24.34 | 41.68 | 8.01 | 25.35 |
| 6 | 6.00 | 23.33 | 40.67 | 7.00 | 24.34 | 41.67 | 8.01 | 25.34 | 42.68 | 9.01 | 26.35 |
| 7 | 7.00 | 24.33 | 41.67 | 8.00 | 25.34 | 42.67 | 9.01 | 26.34 | 43.68 | 10.01 | 27.35 |
| 8 | 8.00 | 25.33 | 42.67 | 9.00 | 26.34 | 43.67 | 10.01 | 27.34 | 44.68 | 11.01 | 28.35 |
| 9 | 9.00 | 26.33 | 43.67 | 10.00 | 27.34 | 44.67 | 11.01 | 28.34 | 45.68 | 12.01 | 29.35 |
| 10 | 10.00 | 27.33 | 44.67 | 11.00 | 28.34 | 45.67 | 12.01 | 29.34 | 46.68 | 13.01 | 30.35 |

Terminal 150 is able to detect the tone on the FCCH in GSM frame 0, 10, 20, 30 or 40. Table 2 indicates the transmission gap in which the tone can be detected for each different frame offset, which is shown with grey shading. For example, terminal 150 can detect the tone on the FCCH in GSM frame 20 with the 8$^{th}$ transmission gap for 1 frame offset, the 5$^{th}$ transmission gap for 2 frame offset, or the 2$^{th}$ transmission gap for 3 frame offset. Terminal 150 can detect the tone on the FCCH in frame 40 with the 9$^{th}$ transmission gap for 4 frame offset, the 6$^{th}$ transmission gap for 5 frame offset, or the 3$^{th}$ transmission gap for 6 frame offset. The transmission gap and GSM frame used for tone detection for each remaining frame offset are given in Table 2. In Table 2, a frame offset of 10 may be encountered if the first transmission gap is aligned with GSM frame 50, in which case the tone on the FCCH may be detected with the 11$^{th}$ transmission gap in GSM frame 30. Table 2 indicates that terminal 150 requires approximately 6 transmission gaps on average to detect the tone for GSM cell x.

In another aspect, terminal 150 performs tone detection using multiple transmission gap pattern sequences allocated by UMTS network 120 for different purposes. In an embodiment, terminal 150 performs tone detection using GAP2 and GAP3. For this embodiment, terminal 150 continues to make RSSI measurements for GSM cells using GAP 1.

transmission gaps in GAP3 are spaced apart by 80 ms, (3) the transmission gaps in GAP3 are offset by 40 ms from the transmission gaps in GAP2, and (4) each transmission gap has a width of 7 slots or 4.67 ms. The number of transmission gaps available from GAP2 and GAP3 is twice the number of transmission gaps available from just GAP2, as illustrated by FIGS. 7A and 7B. FIG. 7B also shows the transmission gaps for GAP2 and GAP3 overlapping different GSM frames for different frame offsets.

Table 3 gives the number of transmission gaps needed for tone detection for GSM cell x using the transmission gaps in GAP2 and GAP3. Two rows are provided in Table 3 for GAP2 and GAP3 for each different frame offset. Each row gives the GSM frame number corresponding to the start of each of the first 10 transmission gaps in one GAP, given the frame offset associated with that row. For example, the second row for 1 frame offset indicates that the start of the first transmission gap in GAP3 is at GSM frame 9.67, the start of the second transmission gap in GAP3 is at GSM frame 27, the start of the third transmission gap in GAP3 is at GSM frame 44.34, the start of the fourth transmission gap in GAP3 is at GSM frame 10.67 in the next multiframe, and so on.

TABLE 3

Tone detection with GAP2 and GAP3

| | Transmission gaps in GAP2 and GAP3 | | | | | | | | | | |
|---|---|---|---|---|---|---|---|---|---|---|---|
| Frame offset | 1 | 2 | 3 | 4 | 5 | 6 | 7 | 8 | 9 | 10 | |
| 1 | 1.00 | 18.33 | 35.67 | 2.00 | 19.34 | 36.67 | 3.01 | 20.34 | 37.68 | 4.01 | GAP2 |
| | 9.67 | 27.00 | 44.34 | 10.67 | 28.01 | 45.34 | 11.68 | 29.01 | 46.35 | 12.68 | GAP3 |

TABLE 3-continued

Tone detection with GAP2 and GAP3

| Frame offset | Transmission gaps in GAP2 and GAP3 | | | | | | | | | | |
|---|---|---|---|---|---|---|---|---|---|---|---|
| | 1 | 2 | 3 | 4 | 5 | 6 | 7 | 8 | 9 | 10 | |
| 2 | 2.00 | 19.33 | 36.67 | 3.00 | 20.34 | 37.67 | 4.01 | 21.34 | 38.68 | 5.01 | GAP2 |
| | 10.67 | 28.00 | 45.34 | 11.67 | 29.01 | 46.34 | 12.68 | 30.01 | 47.35 | 13.68 | GAP3 |
| 3 | 3.00 | 20.33 | 37.67 | 4.00 | 21.34 | 38.67 | 5.01 | 22.34 | 39.68 | 6.01 | GAP2 |
| | 11.67 | 29.00 | 46.34 | 12.67 | 30.01 | 47.34 | 13.68 | 31.01 | 48.35 | 14.68 | GAP3 |
| 4 | 4.00 | 21.33 | 38.67 | 5.00 | 22.34 | 39.67 | 6.01 | 23.34 | 40.68 | 7.01 | GAP2 |
| | 12.67 | 30.00 | 47.34 | 13.67 | 31.01 | 48.34 | 14.68 | 32.01 | 49.35 | 15.68 | GAP3 |
| 5 | 5.00 | 22.33 | 39.67 | 6.00 | 23.34 | 40.67 | 7.01 | 24.34 | 41.68 | 8.01 | GAP2 |
| | 13.67 | 31.00 | 48.34 | 14.67 | 32.01 | 49.34 | 15.68 | 33.01 | 50.35 | 16.68 | GAP3 |
| 6 | 6.00 | 23.33 | 40.67 | 7.00 | 24.34 | 41.67 | 8.01 | 25.34 | 42.68 | 9.01 | GAP2 |
| | 14.67 | 32.00 | 49.34 | 15.67 | 33.01 | 50.34 | 16.68 | 34.01 | 0.35 | 17.68 | GAP3 |
| 7 | 7.00 | 24.33 | 41.67 | 8.00 | 25.34 | 42.67 | 9.01 | 26.34 | 43.68 | 10.01 | GAP2 |
| | 15.67 | 33.00 | 50.34 | 16.67 | 34.01 | 0.34 | 17.68 | 35.01 | 1.35 | 18.68 | GAP3 |
| 8 | 8.00 | 25.33 | 42.67 | 9.00 | 26.34 | 43.67 | 10.01 | 27.34 | 44.68 | 11.01 | GAP2 |
| | 16.67 | 34.00 | 0.34 | 17.67 | 35.01 | 1.34 | 18.68 | 36.01 | 2.35 | 19.68 | GAP3 |
| 9 | 9.00 | 26.33 | 43.67 | 10.00 | 27.34 | 44.67 | 11.01 | 28.34 | 45.68 | 12.01 | GAP2 |
| | 17.67 | 35.00 | 1.34 | 18.67 | 36.01 | 2.34 | 19.68 | 37.01 | 3.35 | 20.68 | GAP3 |
| 10 | 10.00 | 27.33 | 44.67 | 11.00 | 28.34 | 45.67 | 12.01 | 29.34 | 46.68 | 13.01 | GAP2 |
| | 18.67 | 36.00 | 2.34 | 19.67 | 37.01 | 3.34 | 20.68 | 38.01 | 4.35 | 21.68 | GAP3 |

Table 3 indicates the transmission gap and the GAP in which the tone can be detected for each different frame offset, which is shown with grey shading. For example, terminal 150 can detect the tone on the FCCH in GSM frame 10 with the 4$^{th}$ tranmission gap in GAP3 for 1 frame offset or the 1$^{th}$ transmission gap in GAP3 for 2 frame offset. Terminal 150 can detect the tone on the FCCH in GSM frame 20 with the 2$^{th}$ transmission gap in GAP2 for 3 frame offset. The transmission gap, GAP, and GSM frame used for tone detection for each remaining frame offset are given in Table 3. Table 3 indicates that terminal 150 can detect the tone for GSM cell x in approximately 4 transmission gaps on average, which is 50% less than the 6 transmission gaps required for tone detection using only GAP2.

In another embodiment, terminal 150 performs tone detection using GAP1, GAP2 and GAP3. In general, terminal 150 may perform tone detection for any number GSM cells using any number of transmission gap pattern sequences.

In yet another aspect, terminal 150 performs SCH decoding using multiple transmission gap pattern sequences allocated by UMTS network 120 for different purposes. In an embodiment, terminal 150 performs SCH decoding using GAP2 and GAP3. In another embodiment, terminal 150 performs SCH decoding using all three GAP1, GAP2 and GAP3. In general, terminal 150 may perform SCH decoding for any number of GSM cells using any number of transmission gap pattern sequences.

Terminal 150 may also perform BSIC identification in other manners. For example, terminal 150 may perform tone detection and SCH decoding in the same transmission gap. The SCH decoding performance may be degraded if terminal 150 does not have frequency and coarse timing information.

Figure 8:
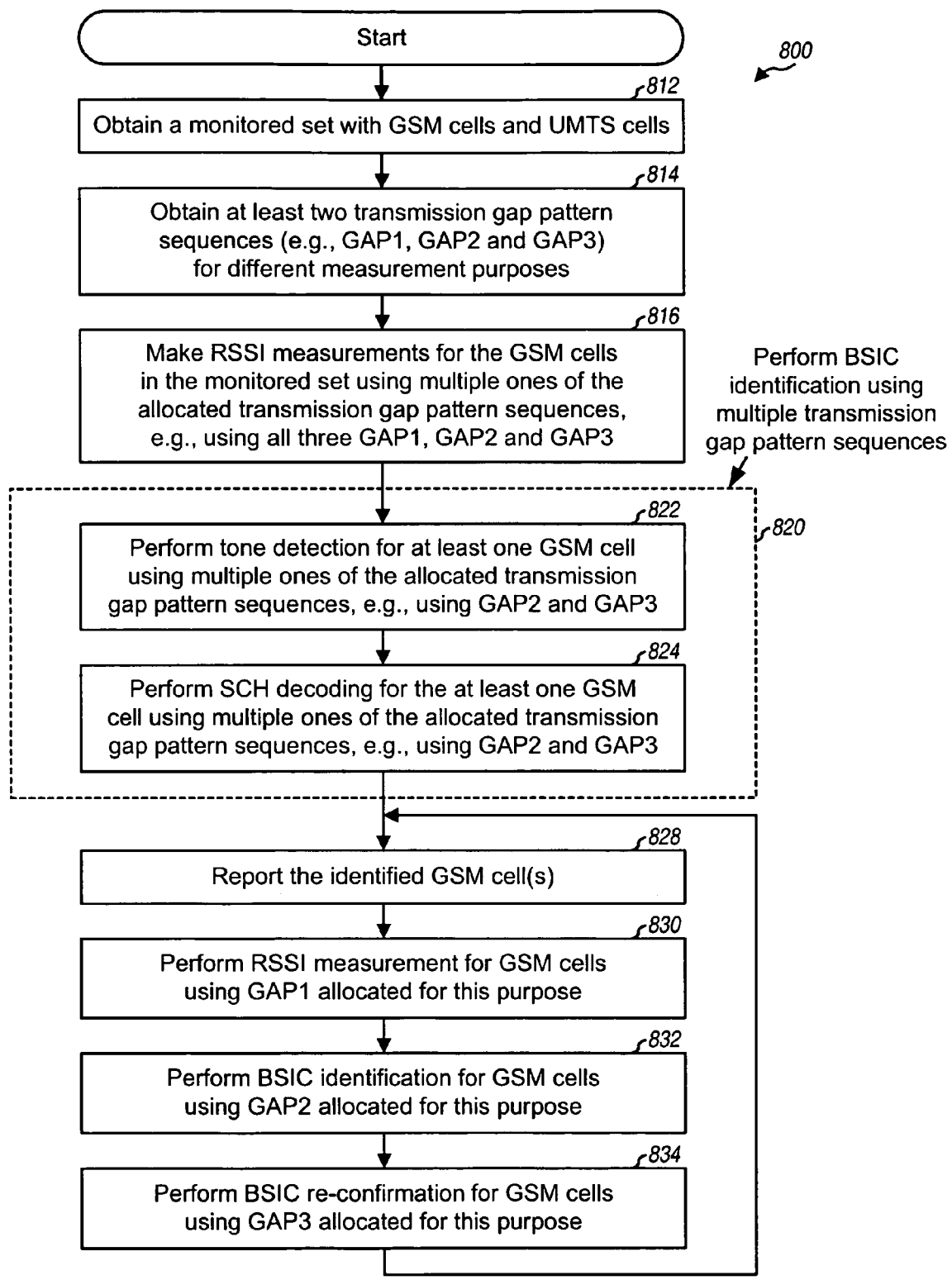
FIG. 8 shows a process for measuring and reporting GSM cells.

FIG. 8 shows a process 800 performed by terminal 150 for measuring and reporting GSM cells. Initially, terminal 150 obtains a monitored set with GSM cells and/or UMTS cells (block 812). Terminal 150 also obtains at least two transmission gap pattern sequences (e.g., GAP1, GAP2 and GAP3) for different measurement purposes (block 814). Terminal 150 makes RSSI measurements for the GSM cells in the monitored set using multiple ones of the allocated transmission gap pattern sequences (e.g., using all three GAP1, GAP2 and GAP3) and obtains an initial set of RSSI measurements (block 816).

Terminal 150 then performs BSIC identification for at least one GSM cell, e.g., the 8 strongest GSM cells (block 820). For the BSIC identification, terminal 150 performs tone detection for the GSM cell(s) using multiple ones of the allocated transmission gap pattern sequences, e.g., using GAP2 and GAP3 (block 822). Terminal 150 then performs SCH decoding for the GSM cell(s) using multiple ones of the allocated transmission gap pattern sequences, e.g., using GAP2 and GAP3 (block 824). Terminal 150 reports the identified GSM cell(s) (block 828).

After the initial reporting, UMTS network 120 has pertinent information to hand terminal 150 over to GSM network 110, if needed. Terminal 150 may then perform RSSI measurement, BSIC identification, and BSIC re-confirmation in the normal manner. Terminal 150 may perform RSSI measurement for GSM cells using the transmission gap pattern sequence allocated for this purpose, e.g., GAP1 (block 830). Terminal 150 may perform BSIC identification for GSM cells using the transmission gap pattern sequence allocated for this purpose, e.g., GAP2 (block 832). Terminal 150 may perform BSIC re-confirmation for GSM cells using the transmission gap pattern sequence allocated for this purpose, e.g., GAP3 (block 834). Terminal 150 may report the identified GSM cell(s) whenever a reporting event occurs (block 828).

Figure 9:
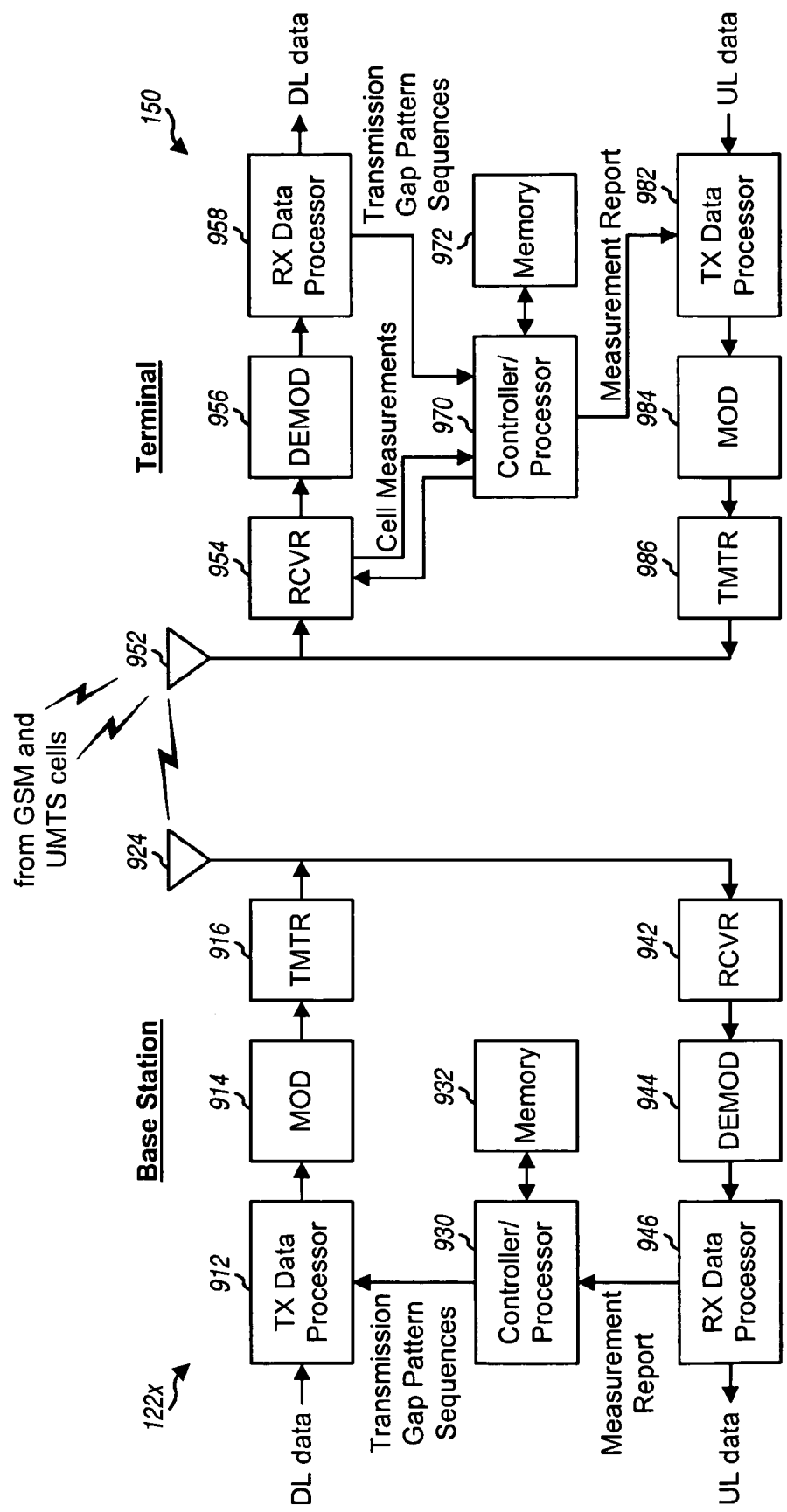
FIG. 9 shows a block diagram of a base station and a terminal.

FIG. 9 shows a block diagram of a base station 122*x* in UMTS network 120 and terminal 150. On the downlink, at base station 122*x*, a transmit (TX) data processor 912 formats, encodes, and interleaves traffic data and signaling for terminal 150. A modulator (MOD) 914 channelizes/spreads, scrambles, and modulates the output of TX data processor 912 and provides a stream of chips. The processing of traffic data and signaling in UMTS is described in 3GPP TS 25-321, TS 25-308, TS 25-212, and other 3GPP documents. A transmitter (TMTR) 916 conditions (e.g., converts to analog, amplifies, filters, and frequency upconverts) the stream of chips and generates a downlink signal, which is transmitted via an antenna 918.

At terminal 150, an antenna 952 receives the downlink signals from base station 122x and other base stations in the GSM and UMTS networks. Antenna 952 provides a received signal to a receiver (RCVR) 954. Receiver 954 conditions (e.g., filters, amplifies, frequency downconverts, and digitizes) the received signal to obtain input samples. A demodulator (DEMOD) 956 descrambles, dechannelizes/despreads, and demodulates the input samples and provides symbol estimates, which are estimates of the data symbols transmitted by base station 122x. A receive (RX) data processor 958 deinterleaves and decodes the symbol estimates, checks the received packets, and provides decoded data. The processing by demodulator 956 and RX data processor 958 is complementary to the processing by modulator 914 and TX data processor 912, respectively.

On the uplink, traffic data and signaling are processed by a TX data processor 982, further processed by a modulator 984, conditioned by a transmitter 986, and transmitted via antenna 952. At base station 122x, the uplink signal is received by antenna 918, conditioned by a receiver 942, processed by a demodulator 944, and further processed by an RX data processor 946 to recover the uplink data and signaling.

Controllers/processors 930 and 970 control the operation at base station 122x and terminal 150, respectively. Memories 932 and 972 store data and program codes for base station 122x and terminal 150, respectively.

Controller/processor 970 may also implement process 800 in FIG. 8 for cell measurement. Controller/processor 970 receives the monitored set and the allocated transmission gap pattern sequences from UMTS network 120. Controller/processor 970 directs receiver 954 to make measurements for GSM cells at time intervals determined by the transmission gaps in the allocated transmission gap pattern sequences. These cell measurements may be for RSSI measurements, tone detection (for BSIC identification), and SCH decoding (for BSIC identification and re-confirmation). Upon completing the cell measurements and whenever a reporting event is triggered, controller/processor 970 generates a measurement report and sends the report to UMTS network 120.

The cell measurement techniques described provide various advantages. First, the techniques may substantially reduce the amount of time needed to measure and report GSM cells. The first set of RSSI measurements may be obtained much faster using all allocated transmission gap pattern sequences. Furthermore, the strongest GSM cells may be identified faster using multiple transmission gap pattern sequences, as described above. This allows the terminal to report the GSM cells sooner, which allows the terminal to be handover to the GSM network faster. The faster handover may reduce the likelihood of dropped call and may improve call reliability.

Second, network capacity may be improved for the UMTS network by better utilization of the allocated transmission gap pattern sequences. Conventionally, the transmission gaps in GAP2 and GAP3 are not used until the initial set of RSSI measurements is obtained. Furthermore, the transmission gaps in GAP3 are not used until the BSICs for the strongest GSM cells are identified. These unused transmission gaps result in a waste of network resources since data may have been sent during these transmission gaps. The allocated transmission gaps may be more fully utilized for cell measurements using the techniques described herein. By completing the cell measurements sooner, the terminal may operate in the compressed mode for a shorter time duration, which may improve network capacity.

For clarity, the cell measurement techniques have been specifically described for GSM and UMTS networks. These techniques may also be used for other types of networks, which may implement other CDMA, TDMA, FDMA, and/or other RATs.

The cell measurement techniques described herein may be implemented by various means. For example, these techniques may be implemented in hardware, firmware, software, or a combination thereof. For a hardware implementation, the processing units used to perform cell measurement may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The software codes may be stored in a memory (e.g., memory 972 in FIG. 9) and executed by a processor (e.g., processor 970). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   at least one processor configured to obtain at least two transmission gap pattern sequences for at least two measurement purposes, and to make received signal strength indicator (RSSI) measurements for neighbor cells using multiple ones of the at least two transmission gap pattern sequences; and
   a memory coupled to the at least one processor;
   wherein the at least two transmission gap pattern sequences comprise at least two of a first transmission gap pattern sequence with a purpose of GSM carrier RSSI measurement, a second transmission gap pattern sequence with a purpose of GSM initial BSIC identification, and a third transmission gap pattern sequence with a purpose of GSM BSIC re-confirmation.

2. The apparatus of claim 1, wherein the at least one processor is configured to perform base transceiver station identity code (BSIC) identification for at least one GSM cell using multiple ones of the at least two transmission gap pattern sequences.

3. The apparatus of claim 1, wherein the at least one processor is configured to perform base transceiver station identity code (BSIC) identification for at least one GSM cell using at least the second and third transmission gap pattern sequences.

4. The apparatus of claim 3, wherein the at least one processor is configured to perform BSIC re-confirmation using the third transmission gap pattern sequence.

5. The apparatus of claim 3, wherein the at least one processor is configured to send a report for the at least one GSM cell and, after sending the report, to make RSSI measurements for the neighbor cells using the first transmission gap pattern sequence, to perform BSIC identification using the second transmission gap pattern sequence, and to perform BSIC re-confirmation using the third transmission gap pattern sequence.

6. The apparatus of claim 1, wherein the at least one processor is configured to perform tone detection for at least one GSM cell using at least the second and third transmission gap pattern sequences.

7. The apparatus of claim 1, wherein the at least one processor is configured to decode a synchronization channel (SCH) for at least one GSM cell using at least the second and third transmission gap pattern sequences.

8. The apparatus of claim 1, wherein the at least one processor is configured to receive a monitored set with GSM cells, and to make the RSSI measurements for the GSM cells using the at least two transmission gap pattern sequences.

9. A method implemented on an apparatus comprising a receiver, the method comprising:
obtaining at least two transmission gap pattern sequences for at least two measurement purposes; and
making, via the receiver, received signal strength indicator (RSSI) measurements for neighbor cells using multiple ones of the at least two transmission gap pattern sequences;
wherein the obtaining the at least two transmission gap pattern sequences comprises:
obtaining a first transmission gap pattern sequence with a purpose of GSM carrier RSSI measurement, a second transmission gap pattern sequence with a purpose of GSM initial BSIC identification, and a third transmission gap pattern sequence with a purpose of GSM BSIC re-confirmation, and wherein the RSSI measurements are made using the first, second, and third transmission gap pattern sequences.

10. The method of claim 9, further comprising:
performing base transceiver station identity code (BSIC) identification for at least one GSM cell using multiple ones of the at least two transmission gap pattern sequences.

11. The method of claim 9, further comprising:
performing tone detection for at least one GSM cell using at least the second and third transmission gap pattern sequences; and
decoding a synchronization channel (SCH) for the at least one GSM cell using at least the second and third transmission gap pattern sequences.

12. An apparatus comprising:
means for obtaining at least two transmission gap pattern sequences for at least two measurement purposes; and
means for making received signal strength indicator (RSSI) measurements for neighbor cells using multiple ones of the at least two transmission gap pattern sequences;
wherein the means for obtaining the at least two transmission gap pattern sequences comprises:
means for obtaining a first transmission gap pattern sequence with purpose of GSM carrier RSSI measurement, a second transmission gap pattern sequence with purpose of GSM initial BSIC identification, and a third transmission gap pattern sequence with pur-
pose of GSM BSIC re-confirmation, and wherein the RSSI measurements are made using the first, second, and third transmission gap pattern sequences.

13. The apparatus of claim 12, further comprising:
means for performing base transceiver station identity code (BSIC) identification for at least one GSM cell using multiple ones of the at least two transmission gap pattern sequences.

14. The apparatus of claim 12, wherein the means for making RSSI measurements for neighbor cells using multiple ones of the at least two transmission gap pattern sequences further comprises means for using the first, second, and third transmission gap pattern sequences.

15. The apparatus of claim 12, further comprising:
means for performing tone detection for at least one GSM cell using at least the second and third transmission gap pattern sequences; and
means for decoding a synchronization channel (SCH) for the at least one GSM cell using at least the second and third transmission gap pattern sequences.

16. A processor readable media for storing instructions operable in a terminal to:
obtain at least two transmission gap pattern sequences for at least two measurement purposes;
make received signal strength indicator (RSSI) measurements for neighbor cells using multiple ones of the at least two transmission gap pattern sequences; and
wherein to obtain at least two transmission gap pattern sequences further comprises to obtain a first transmission gap pattern sequence with a purpose of GSM carrier RSSI measurement, a second transmission gap pattern sequence with a purpose of GSM initial BSIC identification, and a third transmission gap pattern sequence with a purpose of GSM BSIC re-confirmation for the at least two transmission gap pattern sequences.

17. The processor readable media of claim 16, and further for storing instructions operable to:
perform base transceiver station identity code (BSIC) identification for at least one GSM cell using multiple ones of the at least two transmission gap pattern sequences.

18. The processor readable media of claim 16, and further for storing instructions operable to:
make the RSSI measurements using the first, second, and third transmission gap pattern sequences.

19. The processor readable media of claim 16,
perform tone detection for at least one GSM cell using at least the second and third transmission gap pattern sequences, and
decode a synchronization channel (SCH) for the at least one GSM cell using at least the second and third transmission gap pattern sequences.

20. An apparatus, comprising:
at least one processor configured to obtain at least two transmission gap pattern sequences for at least two measurement purposes, and to make received signal strength indicator (RSSI) measurements for neighbor cells using the at least two transmission gap pattern sequences;
a memory coupled to the at least one processor;
wherein the at least two transmission gap pattern sequences comprise a first transmission gap pattern sequence with a purpose of GSM carrier RSSI measurement, a second transmission gap pattern sequence with a purpose of GSM initial BSIC identification, and a third transmission gap pattern sequence with a purpose of GSM BSIC re-confirmation; and wherein the at least one processor is configured to perform tone detection for at least one GSM cell using at least the second and third transmission gap pattern sequences.

21. An apparatus, comprising:
at least one processor configured to obtain at least two transmission gap pattern sequences for at least two measurement purposes, and to make received signal strength indicator (RSSI) measurements for neighbor cells using the at least two transmission gap pattern sequences;
a memory coupled to the at least one processor;
wherein the at least two transmission gap pattern sequences comprise a first transmission gap pattern sequence with a purpose of GSM carrier RSSI measurement, a second transmission gap pattern sequence with a purpose of GSM initial BSIC identification, and a third transmission gap pattern sequence with a purpose of GSM BSIC re-confirmation; and
wherein the at least one processor is configured to decode a synchronization channel (SCH) for at least one GSM cell using at least the second and third transmission gap pattern sequences.

22. An apparatus, comprising:
at least one processor configured to obtain at least two transmission gap pattern sequences for at least two measurement purposes, and to make received signal strength indicator (RSSI) measurements for neighbor cells using the at least two transmission gap pattern sequences;
a memory coupled to the at least one processor;
wherein the at least two transmission gap pattern sequences comprise a first transmission gap pattern sequence with a purpose of GSM carrier RSSI measurement, a second transmission gap pattern sequence with a purpose of GSM initial BSIC identification, and a third transmission gap pattern sequence with a purpose of GSM BSIC re-confirmation; and
wherein the at least one processor is configured to perform base transceiver station identity code (BSIC) identification for at least one GSM cell using at least the second and third transmission gap pattern sequences by:
performing tone detection for at least one GSM cell using at least the second and third transmission gap pattern sequences; and
decoding a synchronization channel (SCH) for at least one GSM cell using at least the second and third transmission gap pattern sequences.

23. A method, comprising:
obtaining at least two transmission gap pattern sequences for at least two measurement purposes;
making received signal strength indicator (RSSI) measurements for neighbor cells using the at least two transmission gap pattern sequences;
performing tone detection for at least one GSM cell using at least the second and third transmission gap pattern sequences;
decoding a synchronization channel (SCH) for the at least one GSM cell using at least the second and third transmission gap pattern sequences;
wherein the obtaining the at least two transmission gap pattern sequences comprises
obtaining a first transmission gap pattern sequence with a purpose of GSM carrier RSSI measurement, a second transmission gap pattern sequence with a purpose of GSM initial BSIC identification, and a third transmission gap pattern sequence with a purpose of GSM BSIC re-confirmation; and
wherein the RSSI measurements are made using the first, second, and third transmission gap pattern sequences.

24. An apparatus comprising:
means for obtaining at least two transmission gap pattern sequences for at least two measurement purposes;
means for making received signal strength indicator (RSSI) measurements for neighbor cells using the at least two transmission gap pattern sequences;
means for performing tone detection for at least one GSM cell using at least the second and third transmission gap pattern sequences;
means for decoding a synchronization channel (SCH) for the at least one GSM cell using at least the second and third transmission gap pattern sequences;
wherein the means for obtaining the at least two transmission gap pattern sequences comprises
means for obtaining a first transmission gap pattern sequence with a purpose of GSM carrier RSSI measurement, a second transmission gap pattern sequence with a purpose of GSM initial BSIC identification, and a third transmission gap pattern sequence with a purpose of GSM BSIC re-confirmation; and
wherein the RSSI measurements are made using the first, second, and third transmission gap pattern sequences.

25. A processor readable media for storing instructions operable in a terminal to:
obtain at least two transmission gap pattern sequences for at least two measurement purposes;
make received signal strength indicator (RSSI) measurements for neighbor cells using the at least two transmission gap pattern sequences;
perform tone detection for at least one GSM cell using at least the second and third transmission gap pattern sequences;
decode a synchronization channel (SCH) for the at least one GSM cell using at least the second and third transmission gap pattern sequences;
wherein to obtain at least two transmission gap pattern sequences further comprises to obtain a first transmission gap pattern sequence with a purpose of GSM carrier RSSI measurement, a second transmission gap pattern sequence with a purpose of GSM initial BSIC identification, and a third transmission gap pattern sequence with a purpose of GSM BSIC re-confirmation; and
wherein to make received RSSI measurements further comprises to make the RSSI measurements using the first, second, and third transmission gap pattern sequences.

* * * * *